(12) United States Patent
Wang

(10) Patent No.: US 10,227,028 B1
(45) Date of Patent: Mar. 12, 2019

(54) SIDE PROTECTION ADJUSTING DEVICE FOR SEAT

(71) Applicant: TangTring Seating Technology Inc., Huizhou, Guangdong (CN)

(72) Inventor: Zhi-Gang Wang, Guangdong (CN)

(73) Assignee: TANGTRING SEATING TECHNOLOGY INC., Guangdong (CN)

(*) Notice: Subject to any disclaimer, the term of this patent is extended or adjusted under 35 U.S.C. 154(b) by 11 days.

(21) Appl. No.: 15/699,154

(22) Filed: Sep. 8, 2017

(51) Int. Cl.
*B60N 2/90* (2018.01)

(52) U.S. Cl.
CPC ............ *B60N 2/99* (2018.02); *B60N 2/914* (2018.02); *B60N 2/986* (2018.02)

(58) Field of Classification Search
CPC .......... B60N 2/914; B60N 2/986; B60N 2/99
USPC ...................................................... 297/284.9
See application file for complete search history.

(56) References Cited

U.S. PATENT DOCUMENTS

| 2004/0155501 A1* | 8/2004 | McMillen | B60N 2/20 297/284.4 |
| 2005/0046252 A1* | 3/2005 | McMillen | B60N 2/449 297/284.1 |
| 2016/0214511 A1* | 7/2016 | McMillen | B60N 2/643 |
| 2017/0036634 A1* | 2/2017 | Ohno | B60N 2/90 |
| 2018/0056836 A1* | 3/2018 | Schacht | B60N 2/72 |
| 2018/0072199 A1* | 3/2018 | Strumolo | B60N 2/99 |
| 2018/0118060 A1* | 5/2018 | Zouzal | B60N 2/665 |
| 2018/0160816 A1* | 6/2018 | Akaike | A47C 7/00 |

FOREIGN PATENT DOCUMENTS

| CN | 201761399 A | 3/2011 | |
| DE | 4106863 A1 | 9/1992 | |
| DE | 10 2007 009 891 A1 | 9/2008 | |
| DE | 102008053080 A1 * | 4/2010 | B60R 21/207 |
| DE | 20201200875 U1 * | 10/2012 | B60N 2/99 |
| DE | 102011116634 A1 * | 4/2013 | B60N 2/5825 |
| DE | 102015223226 A1 * | 5/2017 | B60N 2/4235 |
| WO | WO-2014126116 A1 * | 8/2014 | B60R 21/207 |
| WO | WO-2015049937 A1 * | 4/2015 | B60N 2/2222 |
| WO | WO-2015092505 A1 * | 6/2015 | B60N 2/99 |

* cited by examiner

*Primary Examiner* — Ryan D Kwiecinski
(74) *Attorney, Agent, or Firm* — Muncy, Geissler, Olds & Lowe, P.C.

(57) ABSTRACT

A side protection adjusting device for a seat is disposed at a side protection portion of a seat. The side protection portion includes a side plate and a covering element covering the side plate. The device includes a limiting assembly disposed on the side plate and forming an operative space in between with the side plate, a fixing assembly for securing the limiting assembly on the side plate and including an axial portion, an air cushion arranged in the operative space and having an inflated state and a deflated state, and a rotating assembly axially disposed on the axial portion. Thus, the rotating assembly has a rotating state in which the covering element is driven to rotate while the air cushion is becoming the inflated state, and an initial state in which a position of the rotating assembly is restored while the air cushion is becoming the deflated state.

9 Claims, 6 Drawing Sheets

SIDE PROTECTION ADJUSTING DEVICE FOR SEAT

FIELD OF THE INVENTION

The present invention relates to a side protection adjusting device for a seat, and particularly to a device capable of adjusting an angle of a side protection to enhance a covering effect for one sitting on the seat.

BACKGROUND OF THE INVENTION

In order to enhance the covering effect for one sitting on a vehicle seat to prevent the centrifugal force generated during a turn of a vehicle from causing discomfort on a human body receiving the centrifugal force, a side protection portion is provided at each of two sides of a back support portion of the seat. At two sides of a waist of the human body, the two side protection portions produce a covering effect on the human body, so as to alleviate the influence of the centrifugal force on the human body in the vehicle, thus enhancing the comfort of sitting on the seat.

For example, the German Patent No. 4106863 discloses a motor vehicle seat. The motor vehicle seat is provided with a spring core at a rear of a backrest, and two sides of the spring core extend towards two sides of the backrest, respectively. An air cushion is provided at each of two sides of the backrest. When the air cushions are inflated, the two sides of the spring core are pushed to curve towards an inner side of the motor vehicle seat to push side regions to curve towards the inner side of the motor vehicle seat, achieving an effect of covering a human body.

For another example, the German Patent Publication No. 102007009891 discloses an adjusting device for a side protection of a seat. The adjusting device includes an adjusting element, a supporting unit, and a pneumatically actuating positioning unit. The adjusting element is for coupling a side protection of a seat, and includes two parts arranged angled to each other. The supporting unit includes a supporting plate that mechanically supports the adjusting element. The positioning unit (e.g., a balloon) is for positioning the adjusting element relative to the supporting unit, and is coupled to the adjusting element. When the positioning unit is actuated, the adjusting unit is re-positioned to adjust the side protection.

Further, the China Patent No. 201761399 discloses a pneumatic side clamping device including a pressing rod disposed at one side of a pressing plate. The pressing rod is disposed by means of a blocking plate on a backrest. An air cushion is provided between the pressing plate and the pressing rod so as to drive the pressing rod to rotate towards an inner side of the backrest through an operation of the air cushion.

However, although being capable of adjusting the angle of the side protections, the foregoing adjusting devices for the side protections are complicated in structure, causing assembly difficulties.

SUMMARY OF THE INVENTION

In view of the above, it is an object of the present invention to provide a side protection adjusting device for a seat. The side protection adjusting device has a simple structure and is capable of adjusting an angle of the side protection so as to enhance the covering effect for one sitting on the seat.

According to the above object, the present invention provides a side protection adjusting device for a seat. The side protection adjusting device is disposed at a side protection portion of a seat, wherein the side protection portion includes a side plate and a covering element covering the side plate. The side protection adjusting device includes a limiting assembly, a fixing assembly, an air cushion and a rotating assembly. The limiting assembly is disposed on the side plate, and forms an operative space in between with the side plate. The operative space has an open end. The fixing assembly is for securing the limiting assembly on the side plate, and includes an axial portion at a position above the open end of the operative space. The air cushion is arranged in the operative space, and has an inflated state and a deflated state. The rotating assembly includes a shaft portion mutually axially disposed with the axial portion of the fixing assembly, a supporting plate extending from the shaft portion into the covering element, and a pushing plate extending from the shaft portion to the operative space. As such, the rotating assembly is provided with a rotating state and an initial state. In the rotating state, while the air cushion is becoming the inflated state, the pushing plate is pushed to cause the supporting plate to drive, relative to the shaft portion as a center, the covering element to rotate to further drive and adjust the side protection portion towards a predetermined direction of the seat. In the initial state, while the air cushion is becoming the deflated state, the supporting plate is driven by the covering element to rotate relative to the shaft portion as a center to restore a position of the side protection portion on the seat.

In one embodiment, the limiting assembly further includes a limiting plate spaced from the side plate and thus forming the operative space, two connecting plates respectively extending from two sides of the limiting plate along an extension direction of the shaft portion towards a direction of the side plate, and two positioning plates respectively connected to the two connecting plates to secure the limiting assembly on the side plate.

In one embodiment, the fixing assembly further includes a body portion disposed at one edge portion of the side plate, and two fixing portions extending from the body portion towards a direction of the two positioning plates of the limiting assembly, such that the limiting assembly and the fixing assembly are at the same time secured on the side plate through the two positioning plates and the two fixing portions, respectively.

In one embodiment, the fixing assembly further includes two extension portions extending from the body portion and spaced from each other, and the axial portion is formed on the two extension portions.

In one embodiment, the two extension portions are between the two fixing portions.

In one embodiment, the supporting plate appears arc-shaped.

Through the above technical solution, the present invention substantially achieves following effects compared to the prior art.

During an assembly process of the present invention, the rotating assembly is axially disposed on the fixing assembly, the air cushion is installed between the pushing plate and the limiting assembly, and the limiting assembly and the fixing assembly are at the same time secured on the side plate, thus completing the assembly process of the side protection adjusting device, providing a simplified assembly process and enhancing production efficiency of the seat.

DETAILED DESCRIPTION OF THE PREFERRED EMBODIMENTS

Figure 1:
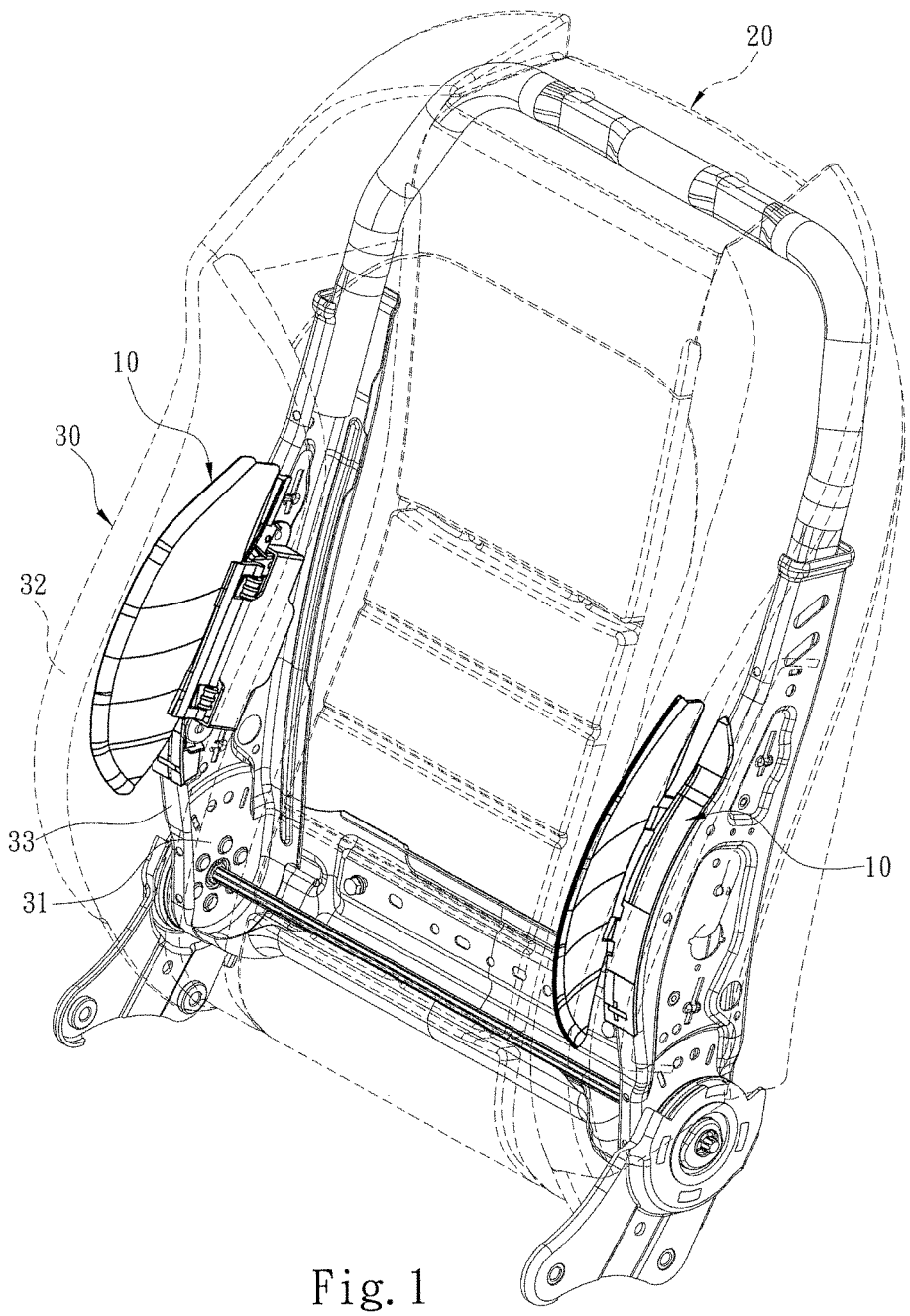
FIG. 1 is a perspective schematic diagram of the present invention applied to a seat.
Figure 2:
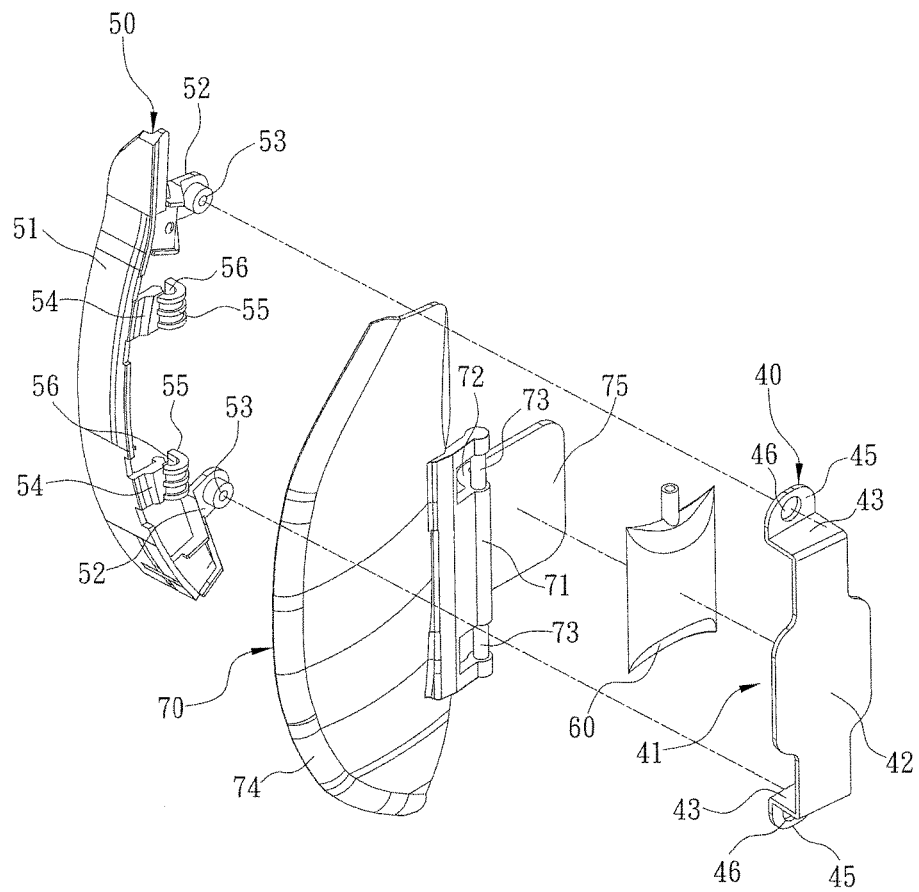
FIG. 2 is an exploded perspective diagram of the present invention from a first viewing angle.

Details and technical contents of the present invention are given with the accompanying drawings below.

Referring to FIG. 1, FIG. 2, FIG. 3 and FIG. 4, a side protection adjusting device 10 for a seat of the present invention is primarily disposed on a side protection portion 30 of a seat 20. The side protection portion 30 of the seat 20 includes a side plate 31 and a covering element 32 covering the side plate 31. The side protection adjusting device 10 includes a limiting assembly 40, a fixing assembly 50, an air cushion 60 and a rotating assembly 70.

The limiting assembly 40 is disposed on the side plate 31, and includes a limiting plate 42 spaced from the side plate 31 and thus forming an operative space 41 in between with the side plate 31, and a connecting plate 43 disposed at each of two ends of the limiting plate 42 extending towards a direction of the side plate 31. As such, the operative space 41 is formed among the side plate 31, the limiting plate 42 and the two connecting plates 43. One side of the operative space 41 is an open end 44. Each of the connecting plates 43 is connected to a positioning plate 45 for securing onto the side plate 31 so as to secure the limiting assembly 40 on the side plate 31 by using the two positioning plates 45.

The fixing assembly 50 is for securing the limiting assembly 40 on the side plate 31, and includes a body portion 51 disposed on an edge portion 33 of the side plate 31, and fixing portions 52 respectively extending from the body portion 51 towards directions of the two positioning plates 45 of the limiting assembly 40 and corresponding to the positioning plates 45, so as to secure the positioning plates 45 on the side plate 31 by using the two fixing portions 52. In this embodiment, each of the positioning plates 45 is disposed between each of the fixing portions 52 and the side plate 31, and may be secured by means of riveting or screwing. For example, each of the positioning plates 45 is provided with a first fixing hole 46, and each of the fixing portions 52 is provided with a second fixing hole 53. By penetrating a screw bolt or a rivet through the first fixing hole 46 and the second fixing hole 53, each of the positioning plates 45 is secured on the side plate 31. Further, two extension portions 54, mutually spaced and extending towards a direction of the operative space 41, are further provided on the body portion 51 and between the two fixing portions 52. One end of each of the extension portions 54 is provided with an axial portion 55 at a position above the open end 44 of the operative space 41. The two axial portions 55 are located at the same center, and each has an axial opening 56. One side of each axial portion 55 has a disconnected portion 57, which as an aperture smaller than an inner diameter of the axial opening 56.

The air cushion 60 is arranged in the operative space 41, and has an inflated state and a deflated state in the operative space 41 through an air pump (prior art, with details omitted herein). The inflated state refers to a state, in which gas is guided to enter the air cushion 60 through the air pump and the interior of the air cushion 60 is filled with the gas. The deflated state refers to a state, in which the interior of the air cushion 60 is not filled with the gas and the air cushion 60 appears flat.

The rotating assembly 70 is axially disposed on the fixing assembly 50, and includes a shaft portion 71 mutually axially arranged with the two axial portions 55 of the fixing assembly 50. In this embodiment, the shaft portion 71 is provided with an axial coupling section 72 at a position corresponding to each of the two axial portions 55. Each of the axial coupling sections 72 has a shaft 73 passing through the disconnected portion 57 and axially disposed in the axial opening 56, allowing the rotating assembly 70 to rotate in the axial opening 56 by using the shaft 73. The rotating assembly 70 is further provided with a supporting plate 74 extending from the shaft portion 71 towards the interior of the covering element 32 of the side protection portion 30 and appearing arc-shaped, and a pushing plate 75 extending from the shaft portion 71 towards a direction of the operative space 41 and into the operative space 41. The pushing plate 75 is located in the operative space 41 and between the air cushion 60 and the side plate 31. In other words, the air cushion 60 is located between the pushing plate 75 and the limiting plate 42.

Figure 3:
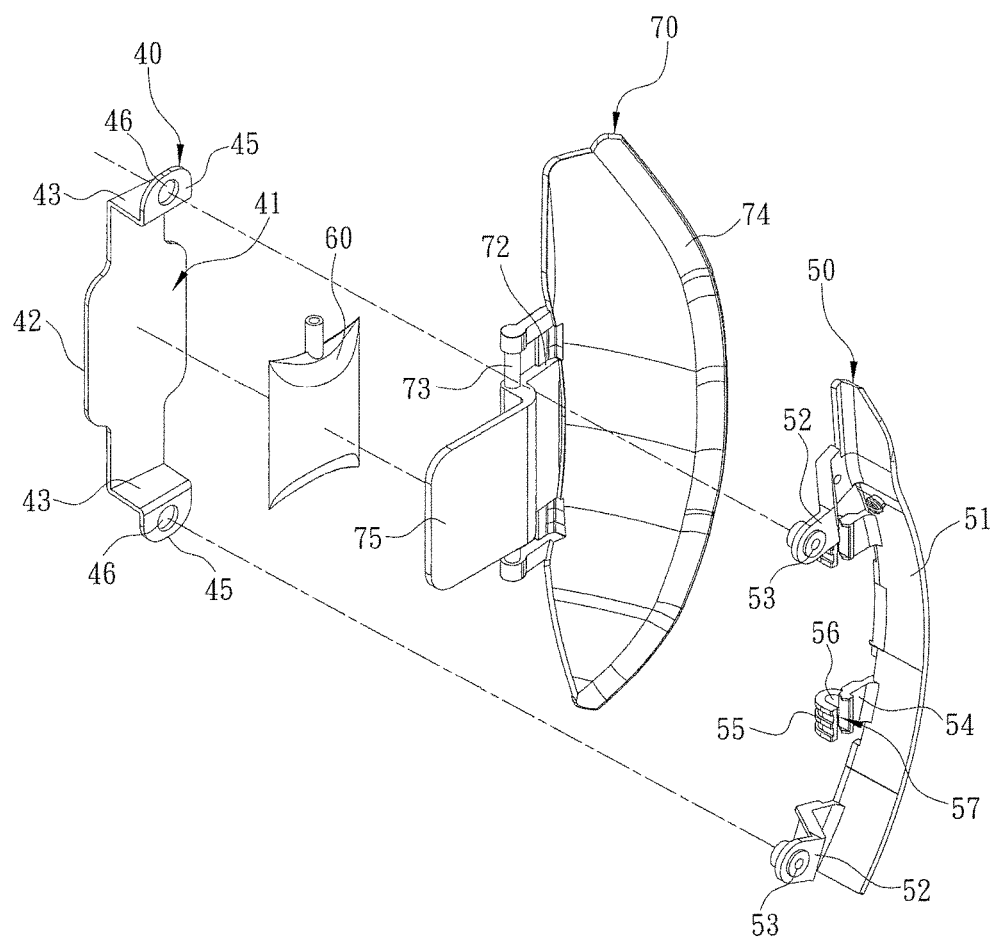
FIG. 3 is an exploded perspective diagram of the present invention from a second viewing angle.
Figure 4:
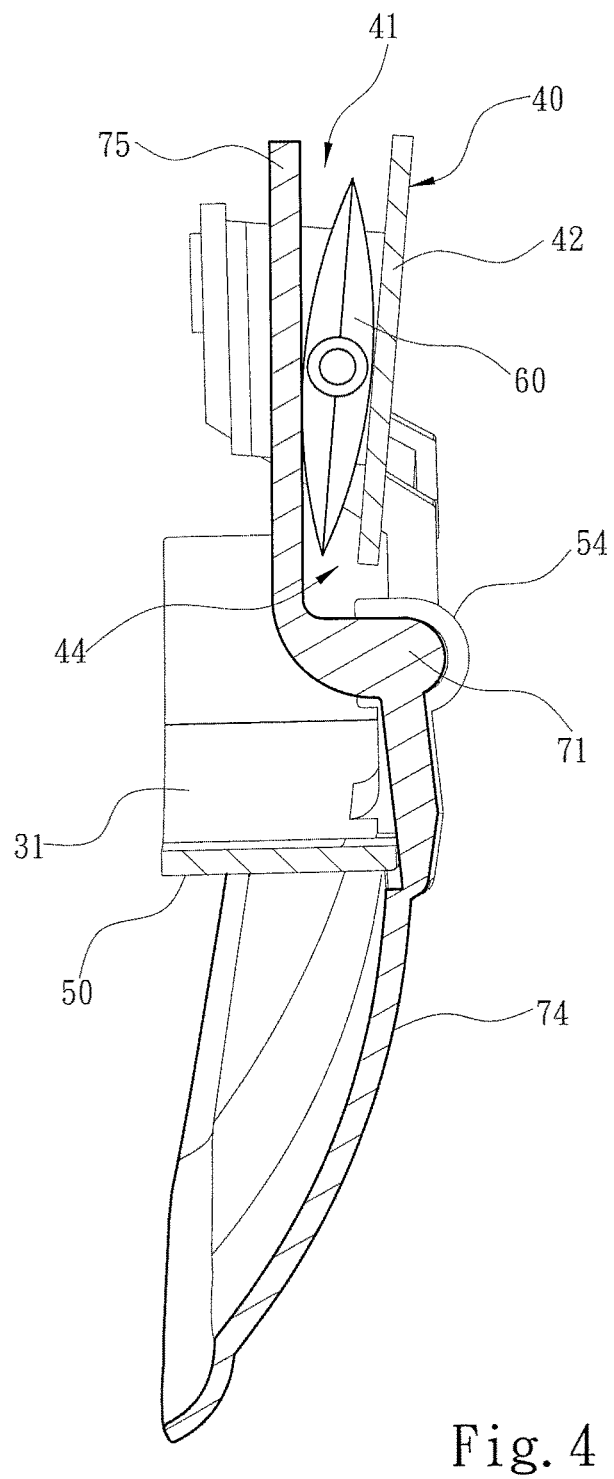
FIG. 4 is a sectional schematic diagram of the present invention having been assembled.

As shown in FIG. 3 and FIG. 4, to assemble the present invention, the rotating assembly 70 is passed through the disconnected portion 57 through the shaft 73 to be axially disposed in the axial opening 56. Thus, the rotating assembly 70 becomes installed on the fixing assembly 50, and is allowed to rotate at the fixing assembly 50 and relative to the axial portion 55 as a center. The air cushion 60 is then arranged between the pushing plate 75 and the limiting plate 42, and the limiting assembly 40 and the fixing assembly 50 are at the same time secured on the side plate 31 by using the positioning plates 45 and the fixing portions 52 by means of bolt screwing or riveting, thus completing the assembly of the side protection adjusting device 10. As such, the assembly process is effectively simplified while assembly efficiency is enhanced.

Figure 5:
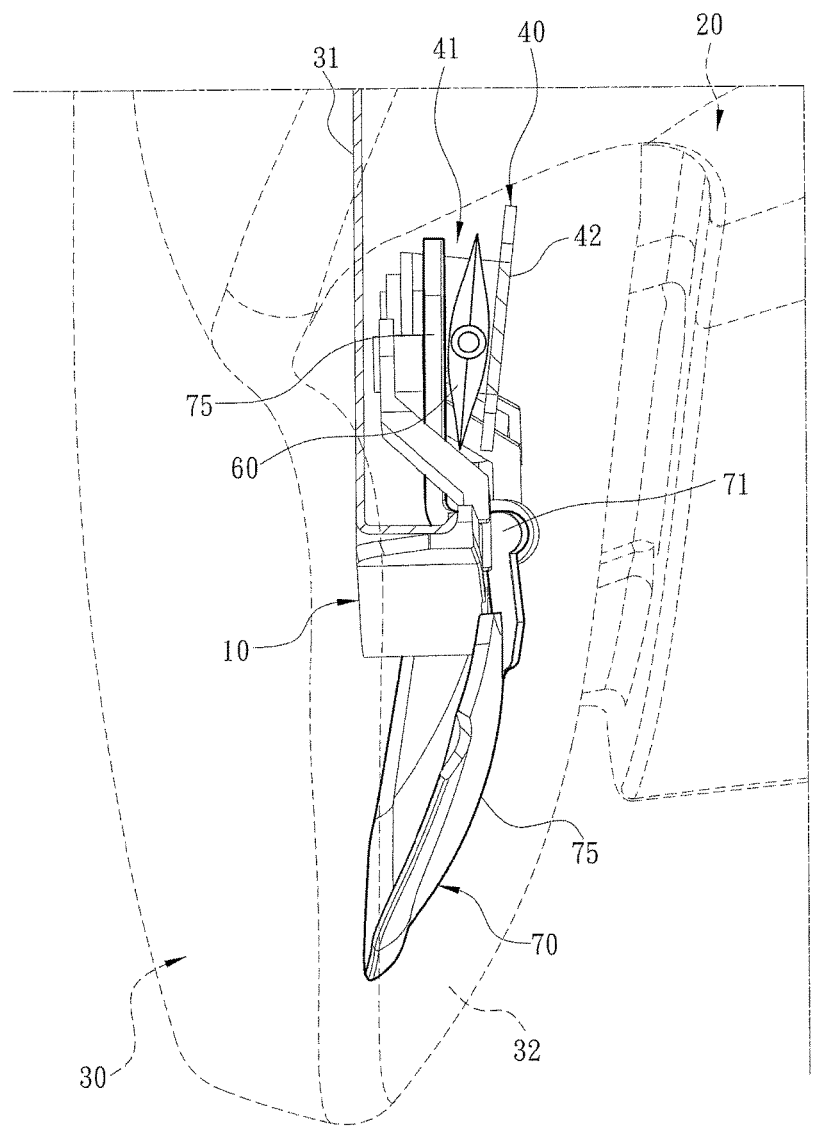
FIG. 5 is a sectional schematic diagram of the present invention installed at an initial position on the seat.
Figure 6:
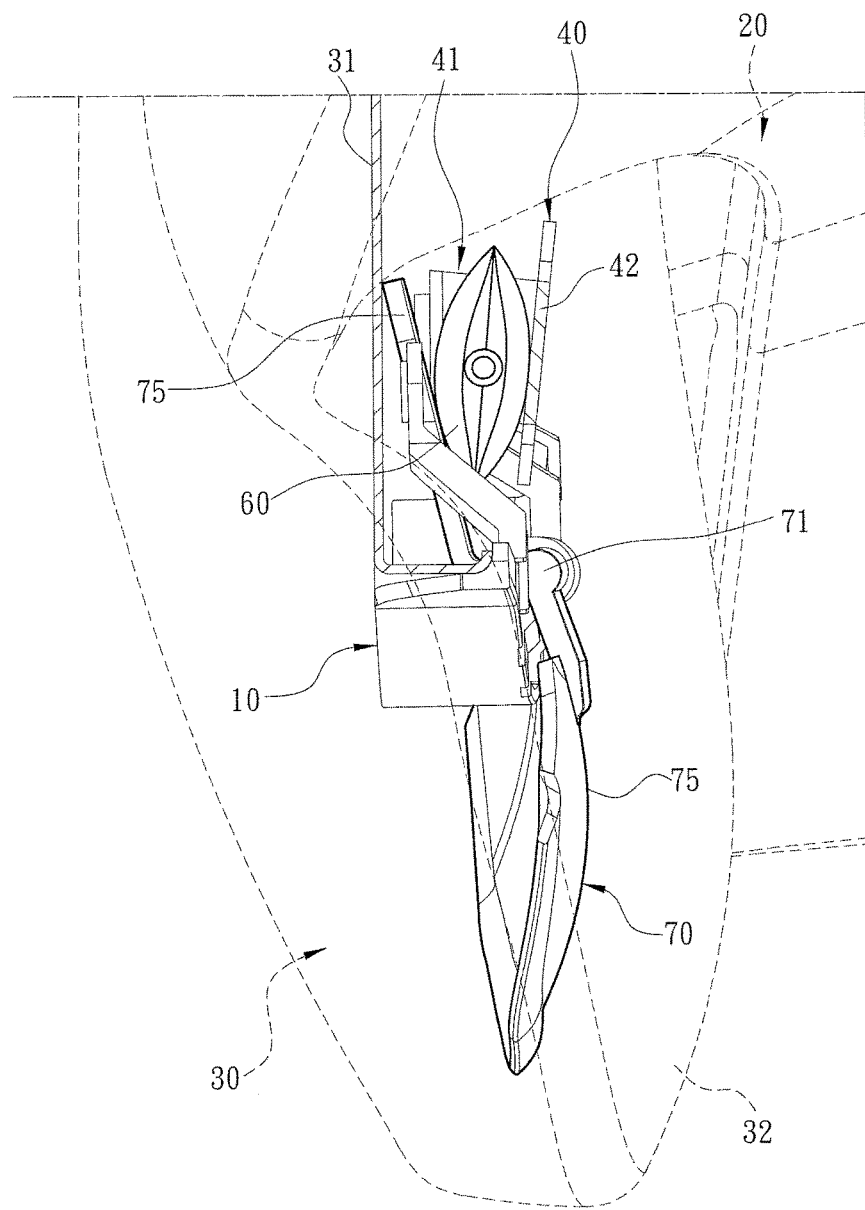
FIG. 6 is a sectional schematic diagram of the present invention in a rotating state on the seat.

As shown in FIG. 5 and FIG. 6, in an implementation of applying the side protection adjusting device 10 to the seat 20, when the air cushion 60 is in the deflated state, the supporting plate 74 of the rotating assembly 70 receives a pulling force of the covering element 32 and is pushed towards a direction of the side plate 31, causing the rotating assembly 70 to rotate relative to the axial portion 55 as the center. At this point, the pushing plate 75 is driven by the supporting plate 74 to rotate towards a direction of the limiting plate 42 and the air cushion 60 becomes compressed between the pushing plate 75 and the limiting plate 42, causing the rotating assembly 70 to be in an initial state and the side protection portion 30 to form a non-covered state on the seat 20.

When the air cushion 60 is in the inflated state, the air cushion 60 receives the effect of the air pump and gradually forms the inflated state between the pushing plate 75 and the limiting plate 42. While the air cushion 60 is becoming the inflated state, because the limiting plate 42 is secured on the side plate 31, the pushing plate 75 is pushed towards a direction of the side plate 31 by the air cushion 60 along with the inflated state of the air cushion 60. When the pushing plate 75 is pushed by the air cushion 60, the supporting plate 74 is at the same time driven to rotate towards an interior of the seat 20. At this point, the supporting plate 74 drives the covering element 32 to rotate towards the direction of the interior of the seat 20, such that the side protection portion 30 is adjusted towards a predetermined direction of the seat 20. The predetermined direction refers to a direction along which the side protection portion 30 rotates towards the interior of the seat 20. As such, the rotating assembly 70 is in a rotating state on the fixing assembly 50, and the side protection portion 30 is caused to form a covering state on the seat 20. When the air cushion 60 is becoming deflated, the supporting plate 74 is driven by the covering element 32 to rotate relative to the shaft portion 71 as the center to restore the position of the side protection portion 30 on the seat 20, causing the rotating assembly 70 to restore to a position of the initial state.

As previously state, while the air cushion 60 is becoming the inflated state between the pushing plate 75 and the limiting plate 42 by using the air pump, the air cushion 60 gradually expands along with the amount of air inflated. The amount of rotation of the side protection portion 30 on the seat 20 increases as the amount of inflation gets larger, and conversely decreases as the amount of inflation gets smaller. Thus, the angle of the side protection portion 30 is adjusted through the amount of inflation to increase the covering effect of the seat 20 for one sitting thereon.

Compared to the prior art, during an assembly process of the present invention, the rotating assembly 70 is first axially disposed on the fixing assembly 50, the air cushion 60 is installed between the pushing plate 75 and the limiting plate 42, and the limiting assembly 40 and the fixing assembly 50 are at the same time secured on the side plate 31, thus completing the assembly process of the side protection adjusting device 10, providing a simplified assembly process and enhancing production efficiency of the seat 20.

What is claimed is:

1. A side protection adjusting device for a seat, disposed at a side protection portion of a seat, the side protection portion comprising a side plate and a covering element covering the side plate, comprising:
   a limiting assembly, disposed on the side plate, forming an operative space in between with the side plate, the operative space having an open end;
   a fixing assembly, for securing the limiting assembly on the side plate, comprising an axial portion located at a position above the open end of the operative space;
   an air cushion, arranged in the operative space, having a deflated state and an inflated state; and
   a rotating assembly, comprising a shaft portion mutually axially arranged with the axial portion of the fixing assembly, a supporting plate extending from the shaft portion to an interior of the covering element, and a pushing plate extending from the shaft portion to the operative space, so as to cause the rotating assembly to have a rotating state, in which, while the air cushion is becoming the inflated state, the pushing plate is pushed to cause the supporting plate to drive, relative to the shaft portion as a center, the covering element to rotate to further drive and adjust the side protection portion in a predetermined direction of the seat, and an initial state, in which, while the air cushion is becoming the deflated state, the supporting plate is driven by the covering element to rotate relative to the shaft portion as a center to further restore a position of the side protection portion on the seat.

2. The side protection adjusting device for a seat of claim 1, wherein the limiting assembly further comprises a limiting plate spaced from the side plate and thus forming the operative space, two connecting plates respectively extending from two sides of the limiting plate along an extension direction of the shaft portion towards a direction of the side plate, and two positioning plates respectively connected to the connecting plates to secure the limiting assembly on the side plate.

3. The side protection adjusting device for a seat of claim 2, wherein the fixing assembly further comprises a body portion disposed on an edge portion of the side plate, and two fixing portions respectively extending from the body portion towards directions of the two positioning plates of the limiting assembly, such that the limiting assembly and the fixing assembly are at the same time secured on the side plate by using the two positioning plates and the two fixing portions, respectively.

4. The side protection adjusting device for a seat of claim 3, wherein the fixing assembly further comprises two extension portions extending from the body portion and mutually spaced, and the axial portion is formed on the two extension portions.

5. The side protection adjusting device for a seat of claim 4, wherein the two extension portions are located between the two fixing portions.

6. The side protection adjusting device for a seat of claim 4, wherein the axial portion has an axial opening, one side of the axial portion has a disconnected portion, and an aperture of the disconnected portion is smaller than an inner diameter of the axial opening.

7. The side protection adjusting device for a seat of claim 3, wherein each of the positioning plates is further provided with a first fixing hole, and each of the fixing portions is further provided with a second fixing hole, such that the positioning plates and the fixing portions are secured on the side plate by using the first fixing hole and the second fixing hole, respectively.

8. The side protection adjusting device for a seat of claim 3, wherein the positioning plates and the fixing portions are secured by means of one of screwing and riveting.

9. The side protection adjusting device for a seat of claim 1, wherein the supporting plate further appears as arc-shaped.

* * * * *